Jan. 27, 1942.  W. A. FLUMERFELT  2,271,293
BALL AND SOCKET JOINT
Filed June 3, 1940

INVENTOR
William A. Flumerfelt
BY
Braselton, Whitcomb Davies
ATTORNEY

Patented Jan. 27, 1942

2,271,293

UNITED STATES PATENT OFFICE 2,271,293

BALL AND SOCKET JOINT

William A. Flumerfelt, Columbus, Ohio, assignor to The Columbus Auto Parts Company, Columbus, Ohio, a corporation of Ohio Application June 3, 1940, Serial No. 338,448

3 Claims. (Cl. 287—90)

This invention relates to joint constructions and more especially to those of a character known as ball joints particularly adaptable for use in tie rod and drag link installations for automotive vehicles.

The invention has for an object the provision of a joint construction having a ball-like configuration made up of a plurality of units surrounded by a bearing means, the several elements of the joint assembly being resiliently held in operative position by spring means.

The invention contemplates a ball type joint construction in which the spherical configuration is formed of a plurality of cup-like members surrounded by split bearing means in combination with spring means acting on the cup-like members to automatically compensate for any wear of the bearing surfaces.

Another object of the invention resides in the provision of a joint structure which is of sealed construction with the lubricant initially assembled into the joint during its manufacture so that further lubrication of the structure during use becomes unnecessary.

Still another object of the invention is the provision of a sealed joint in which the ball configuration is formed of a plurality of hollow elements and the lower part of the joint housing closed by a cup shaped closure providing a relatively large lubricant reservoir for supplying lubricant to the bearing surfaces of the joint construction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which Figure 1 is a vertical sectional view showing a ball and socket construction of my invention;

Figure 1:
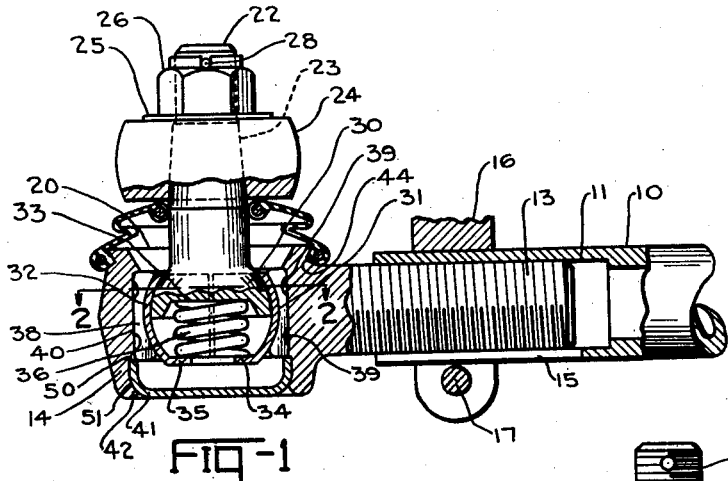
Figure 2:
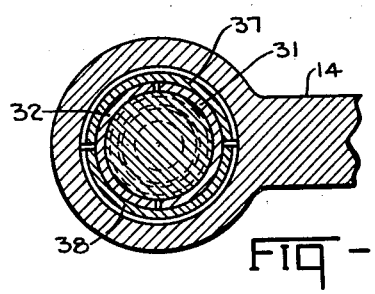
Figure 2 is a horizontal sectional view taken substantially on the line 2—2 of Figure 1.
Figure 3:
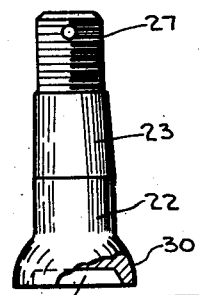
Figure 3 is an elevational view partly in section of a stud member forming an element of the invention.
Figure 4:
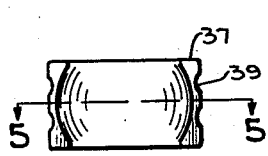
Figure 4 is an elevational view illustrating one of the bearing members of the joint structure.
Figure 5:
Figure 5 is a horizontal sectional view taken substantially on line 5—5 of Figure 4 looking in the direction of the arrows.
Figure 6:
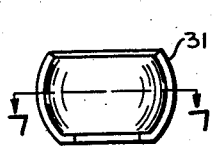
Figure 6 is an elevational view of one of the members forming the ball configuration of the joint.

While I have illustrated the joint construction as especially adapted for a tie rod connection, it is to be understood that my invention may be used in any arrangement where it may be found to be applicable.

Referring to the drawing in detail, there is illustrated a form of joint construction particularly designed for use as a tie rod connection to the dirigible or steerable wheel of a vehicle in which 10 designates the tie rod of tubular formation which is interiorly threaded at one end as at 11 to accommodate a threaded tenon 13 formed as an integral extension of a joint housing 14. The wall of the tube adjacent tenon 13 is slotted longitudinally as at 15 and surrounding the tube is a clamp or collar 16 arranged to be drawn into clamping engagement with tie rod tube 10 by means of bolt 17 and nut (not shown), this means serving to lock the tie rod and joint housing in fixed relation. The housing 14 is of hollow configuration preferably with the interior wall of cylindrical configuration which terminates at its upper extremity in an inwardly extending circular shoulder or flange 20.

Extending into the housing is a stud member 22 having a tapered shank portion 23 adapted to receive an arm 24 which is connected to a dirigible vehicle wheel (not shown), the arm 24 being held in place by means of a washer 25 and a nut 26 engageable with a threaded tenon 27 integrally formed upon the upper end of stud 22, the nut being locked in position by means of a cotter key 28 or other locking means. The lower extremity of the stud 22 is formed with a segmental spherically shaped portion 30 which projects into the interior of housing 14.

Positioned within the joint housing 14 and substantially surrounding the segmental spherical portion 30 of the stud member is a pair of complementary cup-like members 31 and 32 having spherically shaped inner and outer lateral surfaces, the outer surfaces forming together a substantially ball shaped configuration, the inner surfaces coinciding with and engaging the spherically shaped portion 30 of the stud member. The spherically shaped portion of the stud member serves to properly space and position members 31 and 32 to form the ball configuration. The stud member is provided at its lower portion with a recess 33 and the members 31 and 32 are provided at their lower portions with inwardly extending flattened portions 34 and 35 arranged substantially on the same plane. Interposed between the lower portion of the stud and fitting into recess 33 and engaging the flattened portions 34 and 35 of members 31 and 32 is an expansive coil spring 36. Surrounding the members 31 and 32 are complementary bearing seats 37 and 38 which have spherical inner surfaces coinciding with and fitting the exterior surfaces of members 31 and 32, the exterior surfaces of the bearing seat or members 37 and 38 being of cylindrical configuration to snugly fit within the cylindrical inner walls of the housing 14. The bearing seats 37 and 38 are preferably formed with peripheral grooves 39 and 40 to provide lubricant spaces or channels between the bearing seat members and the walls of the housing.

The interior of the housing 14 at its lower portion is formed with a cylindrical recess 40 of larger diameter than the cylindrical configuration which accommodates the bearing seats 37 and 38 and fitted into this recess is an inverted cup-like metal closure 41, the closure 41 being held in place by means of swaging a portion of the housing into engagement with the exterior surface of the cup as shown at 42 to seal the lower portion of the housing. The upper edge 50 of the flange 51 of the closure engages the shoulder formed by the junction of the cylindrical walls of different diameters in the interior of the housing, the shoulder forming a stop or positioning means for the closure. The edge 50 also engages the lower surfaces of the bearing seats 37 and 38 to retain same against vertical movement in the housing.

The coil spring 36 expanding outwardly serves to forcibly urge the spherical portion of the stud member 30 into proper engagement with the longitudinally spaced members 31 and 32 urging these members into bearing engagement with the split seats 37 and 38, forcing the latter into engagement with the interior wall of the housing so that the elements of the joint are at all times resiliently maintained in proper engaging relationship preventing pounding out of the bearing elements. The expansible action of the spring also functions at all times to take up or compensate for any wear of the several bearing surfaces so as to eliminate looseness between the cooperating elements of the joint.

Figure 9:
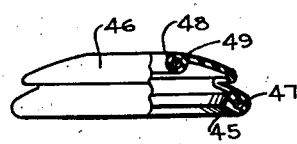
Figure 9 is an elevational view partly in section illustrating a flexible closure for the upper end of the housing.
Figure 8:
Figure 8 is an elevational view partly in section illustrating a closure for the lower portion of the joint housing.

The upper exterior periphery of the housing 14 is provided with a peripheral groove or recess 44 and fitting into this recess is a circular bead 45 integrally formed as a part of a flexible closure boot 46 of rubber or other flexible material. As illustrated in Figures 1 and 9, the beading 45 is preferably provided with a metal wire reinforcement 47 preferably embedded therein, which serves to hold the beading 45 in the groove 44 of the housing to form a seal with the housing. The upper portion of the boot structure 46 is also provided with a beading 48 in which is embedded or moulded a wire reinforcement 49, the beading 48 surrounding the stud member adjacent the lower surface of the arm 24. The beading 48 of the boot structure adheres to the stud member 22 and provides a seal between the boot and the stud member.

Figure 7:
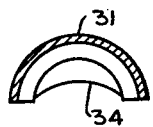
Figure 7 is a horizontal view taken substantially on line 7—7 of Figure 6 looking in the direction of the arrows.

It is to be noted that the space between the lower surface of the stud member 22 and the interior surface of the members 31 and 32 forms a lubricant reservoir. The space between the exterior flattened surfaces of the members 31 and 32 and closure 39 also forms a lubricant reservoir which is in communication with the first mentioned reservoir through a space formed by curved edge portions 44 of the members 31 and 32 as particularly shown in Figures 1 and 7. When the joint structure is assembled the reservoirs so formed are filled with suitable lubricant and after the closure 41 is secured in place and the upper portion of the housing is closed by the flexible boot 46, there is provided a completely sealed joint structure embodying an ample supply of lubricant for the bearing surfaces, which is sufficient for the life of the joint structure.

One of the outstanding features of the joint of the character above described is that the ball configuration of the joint is formed by a pair of complementary hollow members and that the stud member and spring 36 serve to hold the ball forming members 31 and 32 in proper position in the bearing seats 37 and 38 so that relative movement of the stud member is transmitted to the members 31 and 32 and therefore the movement occurs between the exterior surfaces of said members and the interior spherical surfaces of the bearing seats 37 and 38. While there may be some slight relative movement between the exterior surface of the spherically shaped portion 30 of the stud member and the interior concave surfaces of members 31 and 32, the spring 36 tends to resist this relative movement and to transfer the movement to members 31 and 32.

It is apparent that, within the scope of the invention, modifications and different arrangements may be made other than is herein disclosed, and the present disclosure is illustrative merely, the invention comprehending all variations thereof.

What I claim is:

1. A ball stud assembly adapted for use in a joint structure having a hollow housing provided with interior bearing surfaces, said ball stud assembly including a stud member having an enlarged portion arranged to extend into the housing; said enlarged portion having a flattened bottom central portion; a pair of similarly shaped elements substantially surrounding and in engagement with the enlarged portion of said stud member, the exterior lateral surfaces of said elements forming together a partial ball shaped configuration; and spring means positioned within said elements and fitting the central flattened bottom portion of said stud member and directly engaging the inner surfaces of said elements.

2. A ball stud assembly adapted for use in a joint structure having a hollow housing provided with interior bearing surfaces, said ball stud assembly including a stud member having an enlarged portion extending into the housing; the outer surface of said enlarged portion shaped to a segment of a sphere and its bottom section formed with a central recess; a pair of similarly shaped elements substantially surrounding and in engagement with the enlarged portion of said stud member, the exterior lateral surfaces of said elements forming together a partial ball shaped configuration; portions of the interior surfaces being in engagement with the spherically shaped portion of the stud member; resilient means positioned within said elements and fitting in the central recess in said stud member and directly engaging the bottom inner surfaces of said elements.

3. A ball stud assembly adapted for use in a joint structure having a hollow housing provided with interior bearing surfaces, said ball stud assembly including a stud member having an enlarged portion extending into the housing; the outer surface of said enlarged portion shaped to a segment of a sphere and its bottom section formed with a central recess; a pair of similarly shaped sheet metal elements substantially surrounding and portions of the interior surfaces being in engagement with the spherically shaped portion of said stud member, the exterior lateral surfaces of said elements forming together a partial ball shaped configuration, the lower portions of said sheet metal elements being flattened; and resilient means positioned within said elements and fitting in the central recess in said stud member and directly engaging the flattened inner surfaces of said elements.

WILLIAM A. FLUMERFELT.